United States Patent [19]

Yankner et al.

[11] 4,157,320

[45] Jun. 5, 1979

[54] RUBBER PROCESSING AID

[75] Inventors: Paul R. Yankner, Englewood; Nelson N. Schwartz, Teaneck, both of N.J.

[73] Assignee: Technical Processing, Inc., Paterson, N.J.

[21] Appl. No.: 888,605

[22] Filed: Mar. 20, 1978

[51] Int. Cl.$^2$ ............................................. C08L 91/00
[52] U.S. Cl. ........................ 260/28.5 A; 106/287.17; 252/40; 252/40.5; 252/40.7; 260/28.5 B; 260/28.5 D; 260/33.4 R; 260/33.4 PQ; 260/33.6 AQ; 260/718; 260/719; 260/733; 260/745; 260/746; 260/756; 260/757; 260/759; 260/762
[58] Field of Search .................. 106/287.17; 260/756, 260/757, 759, 733, 745, 746, 762, 718, 719, 28.5 A, 28.5 B, 28.5 D, 33.6 AQ, 33.4 R, 33.4 PQ; 252/40, 40.5, 40.7

[56] References Cited

U.S. PATENT DOCUMENTS

| | | | |
|---|---|---|---|
| 4,002,706 | 1/1977 | Pretorius | 264/13 |
| 4,010,129 | 3/1977 | Aron | 260/23.7 M |

OTHER PUBLICATIONS

Chemical Abstracts, vol. 82 (1975), No. 35277r:Dielectric Cylinder Rotation In Electrorheological Systems of Argillaceous Minerals.

*Primary Examiner*—Melvyn I. Marquis
*Attorney, Agent, or Firm*—Kenyon & Kenyon

[57] ABSTRACT

A particulate, relatively free-flowing rubber processing aid capable of imparting release properties and improved flow characteristics to rubber during compounding and molding of the rubber, comprises petrolatum and particulate clay in proportions of petrolatum to clay of from about 1:4 to about 4:1. The amount of processing aid which is effective to impart improved release and flow properties is from about 0.1 to about 5 weight percent of the total rubber compound.

10 Claims, No Drawings

RUBBER PROCESSING AID

The present invention is concerned with a novel rubber processing aid, as well as with the use of that processing aid for improving the compounding of rubber. More particularly, the present invention is concerned with a solid, free-flowing, particulate processing aid capable of imparting release properties and improved flow characteristics to rubber compounds during the milling and molding of compounds, and the use of such a processing aid during compounding.

BACKGROUND

It is well known that natural and synthetic rubbers ordinarily must be mixed or "compounded", with vulcanizing agents, plasticizers, extenders, fillers, pigments and the like, so that the rubber can be cured or vulcanized in a mold to form useful articles. It has often been found necessary to include "processing aids" in the rubber compound prior to molding and curing. These processing aids are primarily intended to improve the mixing of the ingredients of the rubber compound, the flowability of the rubber during processing, and the mold or mill release properties of the rubber, without seriously adversely affecting the properties of the cured rubber. Indeed, to the extent they facilitate uniform dispersion of compound ingredients, they can improve the physical properties of the cured rubber, and by imparting improved flow and mold release properties they can improve the appearance of the molded, cured rubber.

Among the processing aids which have been employed are petroleum products referred to as "petrolatum". As is well known, petrolatum is a smooth, semisolid (at room temperature (77° F.)) blend of mineral oil with waxes crystallized from the residual type of petroleum lubricating oil. Typically, the wax molecules contain 30–70 carbon atoms and are largely straight chains with a few branches or naphthene rings. The waxes ordinarily are in the form of microneedles which hold the oil in a gel. Petrolatum is easily deformed under slight pressure at room temperature, melts in a range of from about 110°–175° F., and molten petrolatum is characterized by high viscosity (i.e., from about 60 to about 120 Saybolt Units at 210° F.).

Petrolatum has been used as a rubber processing aid primarily to improve mold and mill release properties of rubber compounds and to improve the flow properties of rubber during compounding. For these purposes, it ordinarily was employed in small amounts, typically from about ½ to about 5 weight percent, based upon the total rubber compound. However, because of its semisolid nature, it is difficult to employ. It is difficult to remove from containers, to accurately measure the quantity to be added and be certain that the petrolatum is uniformly distributed throughout the compound in the intended proportion.

THE INVENTION

It is an object of this invention to provide an improved rubber processing aid.

Another object is to provide an improved petrolatum-based processing aid.

Still another object is to provide a petrolatum processing aid which is in the form of a particulate, free-flowing solid.

It is a further object of this invention to provide an improved process for mixing petrolatum processing aids with rubber compounds.

In accordance with this invention, it has been found that these and other objects of this invention, which will be apparent from the following specification and examples, are achieved by mixing petrolatum with particulate clay capable of reversibly holding or retaining the petrolatum. It is well known that clays are capable of readily taking up and holding polar compounds by adsorption and/or absorption. It has been unexpectedly found, in accordance with this invention, that clays also can readily take up and hold up to 4, or even more, times their weight of petrolatum to form a particulate, free-flowing solid composition. It has further been found that, when such a composition is added to a rubber compound the petrolatum is released from the clay so that it can perform its intended function of release agent and flow improver. Because the composition is a free-flowing particulate solid, it is easily handled, can be accurately measured, and may be easily and quantitatively dispersed throughout the rubber compound.

The clays which can be employed in accordance may be natural or synthetic clays. As is known, clay minerals are hydrous silicates of aluminum, iron or magnesium, and may contain other mineral particles. Typical natural clays which may be employed in accordance with this invention are the kaolinite, the montmorillonite, the illite, the chlorite and the attapulgite clays, including china clay, kaoline, ball clay, fire clay, flint clay, diaspore clay, mullute bentonite, and the like. Synthetic silica and silicate clay materials, as well as diatomaceous earth may also be employed. For example, synthetic molecular sieves, such as 13A molecular sieves, may be employed if desired. As used herein, the term "clay" embraces both the natural and synthetic clays.

The particle size of the clay is not highly critical, because the clay will be reduced in size during mixing. Particle sizes of up to about 8-mesh (U.S. Standard Sieve Series) have been found most practical; larger particle sizes can be employed if desired.

The composition of this invention is obtained simply by mixing the petrolatum with the clay in the desired proportions, provided that the amount of petrolatum is not so great that a free-flowing powder is not obtained. The maximum amount of petrolatum will vary, depending upon the ability of the clay employed to adsorb the petrolatum. Clays such as attapulgite are more easily able to take up petrolatum than are, e.g., kaolin or bentonite. Attapulgite and synthetic calcium silicate sold as Microcel E by Johns-Mansville Corp. are preferred.

In general, however, the weight ratio of petrolatum to clay can vary from about 1:4 to 4:1, with proportions of from about 1:1 to about 3:1 being preferred.

In addition to petrolatum and clay, the rubber processing aid of this invention may contain other materials, including linear primary alcohols of 12 to 30 carbons such as cetyl alcohol and the like; alkylphenoxypolyethylene glycols wherein the alkyl group contains 6 to 15 carbons and having from about 2 to about 20 ethyleneoxy units such as nonylphenoxytetraethylene glycol and the like; and telomers of epoxides of 2 to 4 carbons such as the polyethylene glycols and polypropylene glycols having from about 2 to about 10 alkylene oxide units, such as tetraethylene glycol and tripropylene glycol and the like. When present, these added ingredients may constitute up to about 25 weight percent, based upon the combined weight of petrolatum and clay.

The processing aid of this invention is added to the rubber at the beginning of the compounding cycle, along with the usual pigment fillers, vulcanizing agents, plasticizers, softeners and the like. If desired the rubber may be masticated and then the additive may be added. Alternatively, the additive of this invention may be added prior to mastication, especially when alkylaryl sulfonate salt agents disclosed in U.S. Pat. No. 4,010,129, U.S. Pat. No. 3,882,062 and U.S. Pat. No. 3,787,341 are employed.

The processing aid is employed in an amount effective to impart improved processing characteristics to the rubber during the milling and shaping steps. These desired properties may be, e.g., (1) improved mill and mold release; (2) improved appearance of the finished article; and (3) lower processing temperatures. In general, such amounts are from about 0.1 to about 5 weight percent, and preferably from about 0.5 to about 2 weight percent, based upon the total compound.

Clays, of course, have been employed as fillers for rubber. However, when used as a filler clay ordinarily is employed in amounts of from about 10 to about 200 parts per 100 parts of rubber. The additive of this invention is employed in small amounts such that the clay does not have any significant effect as a filler.

The processing aids of this invention can be employed in the compounding of natural and synthetic rubber, including styrene-butadiene rubber, ethylene-propylene rubber, butadiene rubber, butadiene-acrylonitrile rubber, chloroprene, and the like. The rubber may be virgin or reclaimed rubber.

EXAMPLE I

Melted petrolatum was slowly added to an equal weight at Attsorb LVM (a ground, heat-treated attapulgus clay obtained from Engelhard Minerals & Chemicals Corp.), with constant agitation to give a free-flowing powder.

(a) Use in Styrene-Butadiene Rubber

A styrene-butadiene rubber stock was prepared using this product as a processing aid, and was compared with the same stock without the processing aid. The formulations were:

| Component | Amount, parts by weight | |
|---|---|---|
| | Control | Test |
| SBR 1502[1] | 100 | 100 |
| Hard clay[2] | 150 | 150 |
| Stearic acid | 1 | 1 |
| Zinc oxide | 3 | 3 |
| Diethylene glycol | 3 | 3 |
| Amax[3] | 1.5 | 1.5 |
| Methyl Tuads[4] | 0.1 | 0.1 |
| Product of this example | — | 2.6 |
| Sulfur[5] | 2 | 2 |

[1] A styrene-butadiene copolymer.
[2] A brand of kaolin sold by R. T. Vanderbilt Company, Inc.
[3] N-Oxydiethylene benzothiazole-2-sulfenamude, an accelerator sold by R. T. Vanderbilt Company, Inc.
[4] Tetramethyl thiuram disulfite, an accelerator sold by R. T. Vanderbilt Co.
[5] Added on the mill.

The stocks were prepared in a Banbury mixer run at 40 R.P.M., molded to form a sheet, and cured at 300° F. for 20 minutes. The rubber stocks were evaluated for ease of processing, and the final products were evaluated for physical properties and appearance. The evaluations are summarized as follows:

| Parameter | Rubber Compound | |
|---|---|---|
| | Control | Test |
| Mixing time (minutes) | 5 | 6 |
| Dump temperature (°F.) | 265 | 235 |
| Tensile strength (psi) | 1625 | 1625 |
| 100% Modulus (psi) | 345 | 345 |
| Elongation (%) | 500 | 500 |
| Hardness (Shore A) | 65 | 63 |
| Dispersion quality | Fair | Very good |
| Ease of mold release | Fair | Very good |
| Ease of mill release | Fair | Good |
| Viscosity (ML4 at 212° F.) | 30 | 25 |

(b) Use in Chloroprene Rubber

The processing aid of this example also was evaluated in a chloroprene rubber composition having the following composition:

| Component | Amount, parts by weight | |
|---|---|---|
| | Control | Test |
| Neoprene GRT[1] | 100 | 100 |
| MT Black | 75 | 75 |
| Dibutoxyethyl phthalate | 7 | 7 |
| Neozone A[2] | 1.5 | 1.5 |
| Neoplax[3] | 10.6 | 10.6 |
| Magnesium oxide | 2.6 | 2.6 |
| SR-111 Oil[4] | 2.5 | 2.5 |
| Product of this example | — | 2.0 |
| Zinc oxide[5] | 4.5 | 4.5 |

[1] A chloroprene polymer sold by E. I. duPont deNemours & Co.
[2] Phenyl-α-napthylamine, an anti-oxidant sold by E. I. duPont deNemours & Co.
[3] A vulcanized vegetable oil sold by American Cyanamide Co.
[4] A naphthenic oil sold by C. P. Hall, Inc.
[5] Added on the mill The results obtained on milling and curing are shown below:

| | Control | Test |
|---|---|---|
| Mixing time (minutes) | 6 | 6 |
| Dump temperature (°F.) | 290 | 235 |
| Tensile strength (psi) | 1635 | 1635 |
| 100% Modulus (psi) | 115 | 115 |
| Elongation (%) | 290 | 295 |
| Hardness (Shore A) | 73 | 72 |
| Dispersion quality | Fair | Very good |
| Ease of mold release | Fair | Good |
| Ease of mill release | Very poor | Good |
| Viscosity (ML 4 at 212° F.) | 39 | 37 |

EXAMPLE II

Four parts by weight of melted petrolatum were slowly added with constant mixing to one part by weight of Microcel E to give a free-flowing product. This powder can be substituted for the processing aid disclosed in Example 1.

EXAMPLE III

A solution of 20 parts cetyl alcohol in 847 parts of melted petrolatum was added to 333 parts synthetic calcium silicate in a ribbon blender. Then 50 parts of monononylphenoxy tetraethylene glycol and 50 parts of tripropylene glycol were added. Finally, 150 parts of ground kaolin was added. After mixing, the product was a fine flowable powder.

(a) Use in Chloroprene Rubber

Chloroprene stocks were prepared using the following recipes (shown as parts by weight):

| Component | Amount, parts by weight | |
|---|---|---|
| | Control | Test |
| Neoprene GRT | 100 | 100 |
| SRF Black[1] | 28 | 28 |
| MT Black[2] | 32 | 32 |
| Ultrasil-VN-3[3] | 12 | 12 |
| Sunthene 380[4] | 10 | 10 |
| Stearic acid | 1 | 1 |
| Paraffin | 3 | 3 |
| Octamine[5] | 4 | 4 |
| Zinc oxide | 15 | 15 |
| Magnesium oxide | 6 | 6 |
| Aranox[6] | 1 | 1 |
| Product of this example | — | 2.12 |

[1]SRF Black: Semi-reinforcing Carbon Black.
[2]MT Black: Medium Thermal Carbon Black.
[3]Ultrasil VN-3: A silica sold by C. P. Hall
[4]Sunthene 380: A napthenic oil sold by Sun Oil Co.
[5]Octamine: A diphenylamine-diisobutylene reaction product used as an antioxidant sold by Uniroyal Chemical Division of Uniroyal, Inc.
[6]Aranox: p-(p-Toluenesulfonylamide) - diphenylamine; an antioxidant sold by Uniroyal Chemical Division of Uniroyal, Inc.

The stocks were prepared in a Banbury mixer run at 40 R.P.M. The tensile strength and elongations were determined; and the ease of mold release and the appearance of the cured stocks were evaluated. Results were as follows:

| | Control | Test |
|---|---|---|
| Tensile strength (psi) | 1790 | 1790 |
| Elongation (%) | 480 | 485 |
| Mold Release | Fair | Good |
| Cured Appearance | Fair | Good |

(b) Use in Natural Rubber

The products of this invention are also useful in the manufacture of articles from natural rubber. Stocks were prepared as follows:

| Component | Amount, parts by weight | |
|---|---|---|
| | Control | Test |
| #4RSS[1] | 100 | 100 |
| MT Black | 60 | 60 |
| Stearic acid | 3 | 3 |
| Zinc oxide | 5 | 5 |
| Sundex 790[2] | 10 | 10 |
| Agerite Superflex[3] | 2 | 2 |
| Antozite 67S[4] | 4 | 4 |
| Amax[5] | 0.5 | 0.5 |
| Sulfur | 2.5 | 2.5 |
| Product of this example | — | 1.77 |

[1]#4RSS: Ribbed Smoked Sheet - A grade of natural rubber.
[2]Sundex 790: An aromatic process oil sold by Sun Oil Co.
[3]Agerite Superflex: A diphenylamine - acetone reaction product sold by R. T. Vanderbilt Company, Inc. used as an antioxidant.
[4]Antozite 67S: N-Hexyl, N'-phenyl-p-phenylene diamine sold by R. T. Vanderbilt Company, Inc. used as an antiozonant.

The stocks were prepared in a Banbury mixer at 40 R.P.M., and the sulfur was then added on a 2 roll mill. The control exhibited only fair dispersion and mill release, and had a poor appearance after cure, while the test stock was good for all three criteria. The physical properties of the two stocks were identical.

EXAMPLE IV

To 500 parts of Attsorb LVM (a powdered, heat-treated attapulgus clay from Engelhard Minerals & Chemicals Corporation) was added 350 parts melted petrolatum and 150 parts Alfol 20+(a mixture of primary linear alcohols with an average of 20+carbon atoms per molecule, and linear hydrocarbons, from Conoco Chemicals, Inc.). After mixing and cooling, the product was free flowing and granular.

(a) Use in Chloroprene Rubber

Chloroprene stocks were prepared using the following recipes (shown as parts by weight):

| Component | Amount, parts by weight | |
|---|---|---|
| | Control | Test |
| Neoprene GRT[1] | 100 | 100 |
| SRF Black[2] | 28 | 28 |
| MT Black[3] | 32 | 32 |
| Ultrasil-VN-3[4] | 12 | 12 |
| Sunthene 380[5] | 10 | 10 |
| Stearic acid | 1 | 1 |
| Paraffin | 3 | 3 |
| Octamine[6] | 4 | 4 |
| Zinc oxide | 15 | 15 |
| Magnesium oxide | 6 | 6 |
| Aranox[7] | 1 | 1 |
| Product of this example | — | 2.12 |

[1]Neoprene GRT: A chloroprene polymer sold by E. I. duPont deNemours & Co.
[2]SRF Black: Semi-reinforcing Carbon Black.
[3]MT Black: Medium Thermal Carbon Black.
[4]Ultrasil VN-3: A silica sold by C. P. Hall Co.
[5]Sunthene 380: A naphthenic oil sold by Sun Oil Co.
[6]Octamine: A diphenylamine-diisobutylene reaction product used as an antioxidant sold by Uniroyal Chemical Division of Uniroyal, Inc.
[7]Aranox: p-(p-Toluenesulfonylamide) - diphenylamine; an antioxidant sold by Uniroyal Chemical Division of Uniroyal, Inc.

The stocks were prepared in a Banbury mixer run at 40 R.P.M. The tensile strength and elongations were determined; and the ease of mold release and the appearance of the cured stocks were evaluated. Results were as follows:

| | Control | Test |
|---|---|---|
| Tensile strength (psi) | 1790 | 1780 |
| Elongation (%) | 480 | 480 |
| Mold Release | Fair | Good |
| Cured Appearance | Fair | Good |

(b) Use in Ethylene-Propylene Rubber

Ethylene-propylene rubber stocks were prepared in a Banbury mixer operated at 40 R.P.M. using the following recipes:

| Component | Amount, parts by weight | |
|---|---|---|
| | Control | test |
| EPCAR-845[1] | 100 | 100 |
| HAF Black[2] | 80 | 80 |
| Sunpar 2100[3] | 40 | 40 |
| Zinc oxide | 5 | 5 |
| Stearic acid | 1 | 1 |
| Captax[4] | 0.5 | 0.5 |
| Unads[5] | 1.75 | 1.75 |
| Methyl Tuads | 1 | 1 |
| Sulfur | 1 | 1 |
| Product of this example | — | 2.3 |

[1]EPCAR-845: An ethylene-propylene-diene terpolymer from B. F. Goodrich Co.
[2]HAR Black: High Abrasion Furnace carbon black.
[3]Sunpar 2100: a paraffinic oil sold by Sun Oil Co.
[4]Captax: Mercaptabenzothiazole-accelerator sold by R. T. Vanderbilt Company, Inc.
[5]Unads: Tetramethyl thiuram monosulfide - ultra-accelerator sold by R. T. Vanderbilt Company, Inc.

The tensile strengths, 100% moduli, elongations, tear strengths, etc. of the stocks were identical, but the control exhibited poor mold release, while that obtained with the processing aid of this example was good.

What is claimed is:

1. A solid, free-flowing particulate rubber processing aid for natural or synthetic rubber, said processing aid comprising petrolatum absorbed on clay, the proportion of petrolatum to clay being from about 1:4 to about 4:1.

2. A rubber processing aid according to claim 1 wherein the proportion of petrolatum to clay is from about 1:1 to about 3:1.

3. A rubber processing aid according to claim 1 wherein said clay is selected from the group consisting of attapulgite, synthetic calcium silicate and kaolin.

4. A rubber processing aid according to claim 1 which also includes at least one additive selected from the group consisting of long chain linear alcohols having from about 12 to about 30 carbons; telomers of epoxides having from about 2 to about 4 carbons and from about 2 to about 10 alkyleneoxy units; and monoalkylphenoxypolyethylene glycols having from about 6 to about 15 carbons in the alkyl group and from about 2 to about 20 ethyleneoxy units, said additive being present in amounts of up to about 25 weight percent based on the combined weight of petrolatum and clay.

5. A rubber processing aid according to claim 4 wherein said alcohol is cetyl alcohol, said alkylphenoxy polyethylene glycol is monononylphenoxytetraethylene glycol and said epoxide telomer is tripropylene glycol.

6. A rubber processing aid according to claim 5 wherein said clay is at least one of kaolin and synthetic calcium silicate.

7. In a method for compounding natural or synthetic rubber wherein said rubber is milled with vulcanizing agents and other conventional additives prior to formation of a finished rubber article, the improvement which comprises charging a rubber processing aid according to claim 1 to the rubber compound prior to the molding step in an amount sufficient to impart improved mill and mold release and improved flow properties to the rubber compound during shaping.

8. A method according to claim 7 wherein said amount is from about 0.1 to about 5 weight percent of the total rubber compound.

9. A method according to claim 8 wherein said processing aid also includes at least one additive selected from the group consisting of long chain linear alcohols having from about 12 to about 30 carbons; telomers of epoxides having from about 2 to about 4 carbons and from about 2 to about 10 alkyleneoxy units; and monoalkylphenoxypolyethylene glycols having from about 6 to about 15 carbons in the alkyl group and from about 2 to about 20 ethyleneoxy units, said additive being present in amounts of up to about 25 weight percent based on the combined weight of petrolatum and clay.

10. A method according to claim 9 wherein said alcohol is cetyl alcohol, said alkylphenoxy polyethylene glycol is monononylphenoxytetraethylene glycol and said epoxide telomer is tripropylene glycol.

* * * * *